United States Patent [19]
Mahoney et al.

[11] Patent Number: 4,980,063
[45] Date of Patent: Dec. 25, 1990

[54] COMPOSITIONS USEFUL FOR PREPARING CELLULOSE ESTER MEMBRANES FOR LIQUID SEPARATIONS

[75] Inventors: Robert D. Mahoney, Danville; Jee I. Kau, Concord, both of Calif.; Roger B. Hornby, Sanford, Mich.; Ernest A. Sharer, Martinez, Calif.

[73] Assignee: The Dow Chemical Company, Midland, Mich.

[21] Appl. No.: 303,591

[22] Filed: Jan. 27, 1989

[51] Int. Cl.$^5$ .............................................. B01D 71/16
[52] U.S. Cl. ........................ 210/500.31; 210/500.32; 264/41
[58] Field of Search ................. 264/53, 200, 41, 49; 210/655, 500.29, 500.30, 500.31, 500.32

[56] References Cited

U.S. PATENT DOCUMENTS

| | | | |
|---|---|---|---|
| 3,129,159 | 2/1964 | Maier et al. | 204/180 |
| 3,423,491 | 1/1969 | McLain et al. | 264/49 |
| 3,483,282 | 12/1969 | Manijikian | 264/41 |
| 3,546,209 | 12/1970 | Lipps | 260/214 |
| 3,567,809 | 3/1971 | Ueno et al. | 264/41 |
| 3,592,672 | 7/1971 | Rowley et al. | 210/500 |
| 3,593,855 | 7/1971 | Stana | 210/500 |
| 3,646,179 | 2/1972 | Stana | 264/41 |
| 3,772,072 | 11/1973 | Brown et al. | 117/144 |
| 3,773,534 | 11/1973 | Kaiser et al. | 106/178 |
| 3,780,147 | 12/1973 | Stana | 264/49 |
| 3,909,279 | 9/1975 | Manijikian | 106/180 |
| 3,957,935 | 5/1976 | Staude | 264/41 |
| 4,147,622 | 4/1979 | Nussbaumer | 210/23 H |
| 4,180,536 | 12/1979 | Howell, Jr. et al. | 264/53 |
| 4,276,173 | 6/1981 | Kell et al. | 210/500.2 |
| 4,342,711 | 8/1982 | Joh et al. | 264/41 |
| 4,543,221 | 9/1985 | Chen et al. | 264/41 |
| 4,587,168 | 5/1986 | Miyagi et al. | 428/369 |
| 4,609,728 | 9/1986 | Spranger et al. | 536/56 |
| 4,681,713 | 7/1987 | Miyagi et al. | 264/41 |

FOREIGN PATENT DOCUMENTS

| | | |
|---|---|---|
| 3447626 | 12/1983 | Fed. Rep. of Germany . |
| 53-82670 | 7/1978 | Japan . |
| 5884007 | 11/1981 | Japan . |
| 60-235852 | 5/1984 | Japan . |
| 59-199807 | 11/1984 | Japan . |
| 605202 | 1/1985 | Japan . |

Primary Examiner—Frank Spear

[57] ABSTRACT

This invention consists of a composition useful for preparing a cellulose ester membrane comprising (1) a cellulose ester, (2) glycerol monoacetate, glycerol diacetate, glycerol triacetate, or mixtures thereof, and (3) optionally glycerol, wherein the cellulose ester membrane prepared from said composition is useful for a membrane liquid separation process such as microfiltration, ultrafiltration, dialysis, or reverse osmosis. In another aspect, this invention is an improved process for using said composition to prepare a cellulose ester membrane by forming a mixture of said composition, heating the mixture to a temperature at which the mixture becomes a homogeneous fluid, and extruding, molding, or casting the homogeneous fluid into a membrane. Another aspect of this invention consists of a cellulose ester membrane wherein the fabricated membrane contains glycerol monoacetate, glycerol diacetate, glycerol triacetate, or mixtures thereof, and optionally glycerol.

23 Claims, 3 Drawing Sheets

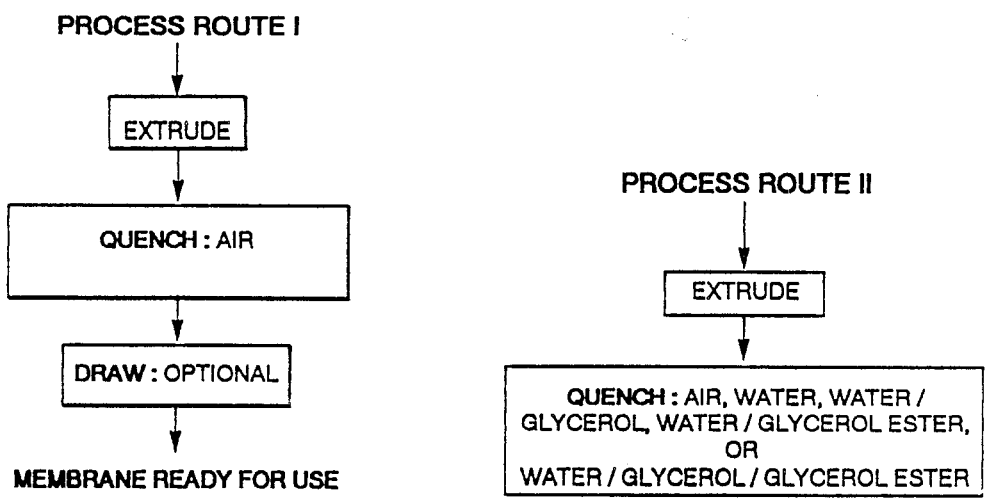
FIG._1.
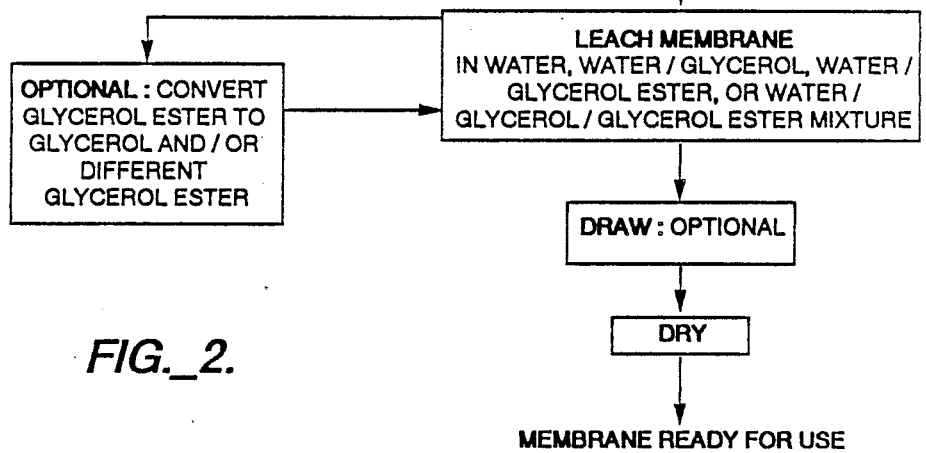
FIG._2.

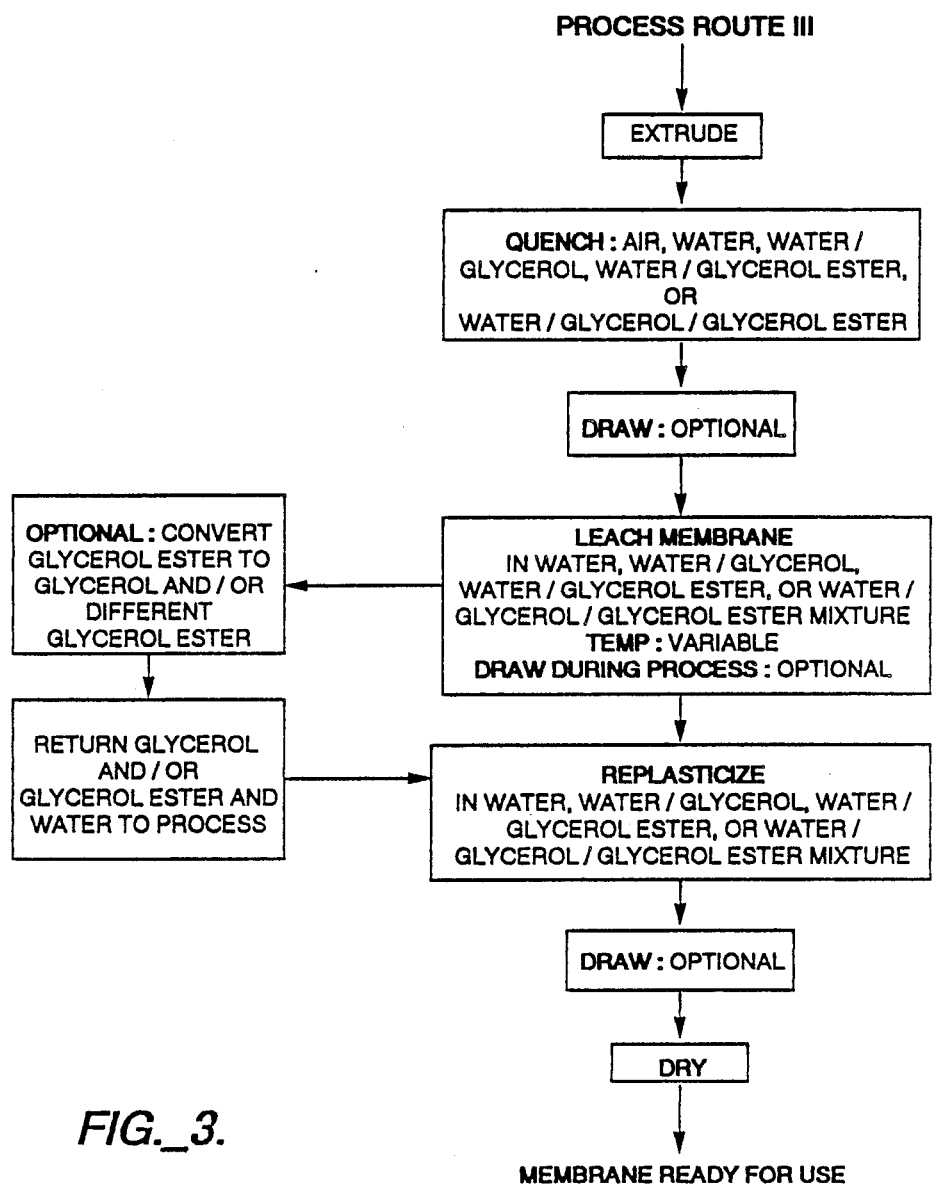
FIG._3.

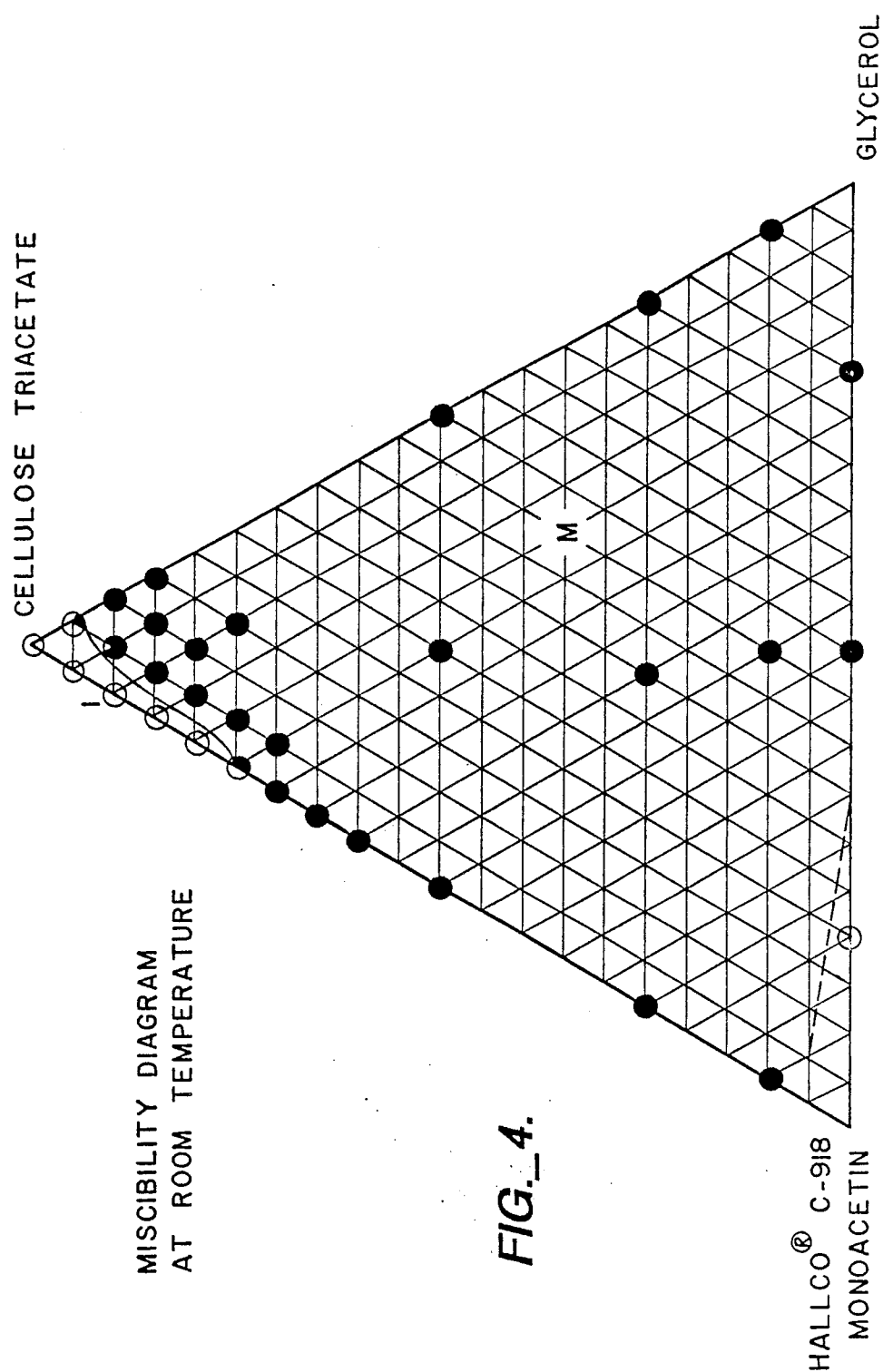

COMPOSITIONS USEFUL FOR PREPARING CELLULOSE ESTER MEMBRANES FOR LIQUID SEPARATIONS

BACKGROUND OF THE INVENTION

This invention relates to a novel composition useful for preparing a semi-permeable cellulose ester membrane useful for liquid separations. This invention further relates to a process utilizing said composition to prepare a semi-permeable cellulose ester membrane useful for liquid separations. This invention still further relates to a semi-permeable cellulose ester membrane containing a certain organic compound or compounds useful for liquid separations.

Cellulose ester membranes have long been used in membrane liquid separation processes such as microfiltration, ultrafiltration, dialysis, and reverse osmosis. Typically, cellulose ester membranes are prepared by extruding, molding, or casting the membranes from blends containing a polymer, a solvent, and an optional non-solvent. Solvents are compounds in which the polymer substantially dissolves at the membrane fabrication temperature. Non-solvents are compounds in which the polymer is substantially insoluble at the membrane fabrication temperature. Solvents which have been used to prepare cellulose ester membranes include sulfolane, dimethylformamide, N-methylpyrrolidone, and acetone. Non-solvents which have been used for cellulose esters include methanol, propanol, water, and maleic acid. Polyethylene glycol has been used as a non-solvent for cellulose triacetate. Even residual amounts of such solvents and non-solvents generally cannot be left in the membranes because they cause unacceptable contamination of the fluids being treated. Avoiding such contamination is particularly important in the treatment of blood by dialysis or the desalination of drinking water by reverse osmosis. The solvents and non-solvents are therefore typically completely removed during membrane fabrication by extensive leaching. Once the solvents and non-solvents are removed from the membranes, they present problems of disposal or extensive repurification before reuse.

Following formation of the membranes and removal of the solvents and non-solvents, it is often desirable to dry the water-wet cellulose ester membranes prior to fabrication of devices, storage, or shipment. However, cellulose ester membranes generally should not be directly dried without pretreatment because direct drying may cause adverse structural changes such as crazing or pore collapse which adversely affect membrane performance. Therefore, the pore structure of the membranes preferably is protected during the drying process. This is generally accomplished by incorporating a non-volatile, water-soluble compound such as glycerol into the pore structure of the membranes prior to drying. The non-volatile, water-soluble material also preferably serves as a surfactant or wetting agent for the later rewetting of the membranes. Such a process is commonly called "replasticization."

Such membrane preparation processes are complex, time consuming, and expensive because they require complete removal of the extruding, molding, or casting solvents and non-solvents, followed by replasticization with a non-volatile compound if the membranes are to be dried. The extrusion, molding, or casting solvents must be able to dissolve the cellulose ester to form an extrudable, moldable, or castable homogeneous blend. However, if such a compound is also used for the replasticization agent, membrane integrity could be adversely affected. Therefore, to date, the solvents used for extrusion, molding, or casting necessarily differ from the replasticization agents, resulting in a multi-step membrane preparation process. Such complex, multi-step membrane fabrication processes may result in significant variations in membrane performance.

What is needed are extrusion, molding, or casting compositions for cellulose esters in which the solvents and non-solvents are not harmful or deleterious or which can be converted into substances which are not harmful or deleterious in the end use of the membranes. Accordingly, such solvents and non-solvents would not have to be leached from the membranes prior to use. Furthermore, solvents and non-solvents which function both as plasticizers during extrusion, molding, or casting and replasticization agents during drying are highly desired.

SUMMARY OF THE INVENTION

This invention is a novel composition useful for preparing a semi-permeable cellulose ester membrane comprising a mixture of:
1. at least one cellulose ester,
2. at least one solvent selected from the group consisting essentially of glycerol monoacetate, glycerol diacetate, glycerol triacetate, and mixtures thereof, in an amount itself sufficient to solubilize the cellulose ester at the membrane formation temperature, and
3. optionally, the non-solvent glycerol;

wherein the cellulose ester, solvent, and optional non-solvent are present in a ratio useful to form a semi-permeable membrane useful for a liquid separation process.

In another aspect, this invention is a process for preparing a semi-permeable cellulose ester membrane from said composition comprising:
1. forming a mixture comprising:
   a. at least one cellulose ester,
   b. at least one solvent selected from the group consisting essentially of glycerol monoacetate, glycerol diacetate, glycerol triacetate, and mixtures thereof, in an amount itself sufficient to solubilize the cellulose ester at the membrane formation temperature, and
   c. optionally, the non-solvent glycerol;
2. heating the mixture to a temperature at which the mixture becomes a homogeneous fluid;
3. extruding, molding, or casting the homogeneous fluid into a semi-permeable membrane; and
4. passing the membrane through one or more quench zones wherein the membrane gels and solidifies;

wherein the semi-permeable membrane so formed is useful for a membrane liquid separation process.

Another aspect of the invention is a semi-permeable cellulose ester membrane comprising a cellulose ester membrane useful for liquid separations containing at least one compound selected from the group consisting essentially of glycerol monoacetate, glycerol diacetate, glycerol triacetate, and mixtures thereof, and optionally glycerol.

Because the solvents (glycerol monoacetate, glycerol diacetate, glycerol triacetate, and mixtures thereof) and non-solvent (glycerol) from which the membrane is prepared are or can be converted into substances the presence of which are compatible and/or accepted in the end use of the membrane, the membrane does not require extensive leaching prior to use. Furthermore, in some cases the solvents and non-solvent may serve as both the plasticizer and replasticization agent, thus eliminating the need for a separate replasticization step.

BRIEF DESCRIPTION OF THE DRAWINGS

FIGS. 1–3 illustrate several alternative process schemes for fabricating membranes under this invention.

FIG. 4 illustrates the miscibility of various compositions of cellulose triacetate, Hallco ® C-918 Monoacetin ( ®trademark of the C. P. Hall Company), and glycerol at ambient temperature and pressure.

DETAILED DESCRIPTION OF THE INVENTION

This invention consists of compositions useful for forming cellulose ester membranes comprising at least one cellulose ester, at least one solvent selected from the group consisting essentially of glycerol monoacetate, glycerol diacetate, glycerol triacetate, and mixtures thereof, in an amount itself sufficient to solubilize the cellulose ester at the membrane formation temperature, and optionally the non-solvent glycerol; wherein the cellulose ester, solvent, and optional non-solvent are present in a ratio useful to form a semi-permeable membrane useful for a liquid separation process.

Cellulose esters and their synthesis are well known in the art. See "Cellulose Esters, Organic," *Encyclopedia of Polymer Science and Engineering*, 2nd edition, Vol. 3, Wiley Interscience, New York, 1985, pp. 158–226, the relevant portions relating to synthesis incorporated herein by reference. Preferred cellulose esters useful in this invention include cellulose acetate, cellulose propionate, cellulose butyrate, cellulose nitrate, cellulose methacrylate, cellulose phthalate, and mixtures thereof. Mixed cellulose esters such as cellulose acetate propionate, cellulose acetate butyrate, and cellulose acetate methacrylate are also within the scope of the invention. The term "mixed cellulose esters" refers to cellulose esters in which the polymer backbone contains at least two different cellulose ester moieties. Mixed cellulose esters are thus distinct from physical mixtures or blends of two or more different cellulose esters. Cellulose esters which are more preferred for use in this invention are the cellulose acetates, commonly referred to as cellulose acetate, cellulose diacetate, cellulose triacetate, and mixtures thereof. The cellulose acetates possess different acetyl contents depending upon the degree of substitution. The acetyl content ranges from 11.7 weight percent for a degree of substitution of 0.5 to 44.8 weight percent for a degree of substitution of 3.0. Cellulose diacetate, with an acetyl content of from about 32.0 to about 41.0 weight percent, and cellulose triacetate, with an acetyl content of from about 41.0 to about 44.8 weight percent, and mixtures thereof, are especially preferred for use in this invention.

Preferred solvents useful in this invention are glycerol monoacetate (acetin), glycerol diacetate (diacetin), glycerol triacetate (triacetin), and mixtures thereof. More preferred solvents are glycerol monoacetate, glycerol diacetate, and mixtures thereof. The solvents useful in this invention may optionally contain small amounts of other compounds which are not deleterious to the membrane or unacceptable in its applications. Preferably the presence of these minor impurities in the solvent is less than about 15 weight percent, more preferably less than about 5 weight percent.

The optional non-solvent preferred in this invention is glycerol.

The concentrations of the components in the extrusion, molding, or casting composition may vary. Miscibility of the composition at the extrusion, molding, or casting temperature is one factor to be considered in forming the extrusion, molding, or casting composition. Miscibility of polymer solutions may be readily determined empirically by methods known in the art. The amount of glycerol acetate, glycerol diacetate, or glycerol triacetate solvent used in the composition is advantageously sufficient to itself solubilize the cellulose ester polymer at the extrusion, molding, or casting temperature; that is, no other solvent other than the glycerol acetates is necessary to solubilize the cellulose ester. The end use of the membrane is another factor in determining the appropriate blend composition, because the preferred pore size and transport rate through the membrane vary dependent upon the intended membrane end use.

In the case of membranes useful for ultrafiltration or microfiltration, the concentration of cellulose ester is preferably at least about 10 weight percent, more preferably at least about 15 weight percent; the concentration of cellulose ester is preferably less than about 80 weight percent, more preferably less than about 60 weight percent. The concentration of the solvent (glycerol monoacetate/glycerol diacetate/glycerol triacetate/mixtures thereof) is preferably at least about 20 weight percent, more preferably at least about 40 weight percent; the concentration of solvent is preferably less than about 90 weight percent, more preferably less than about 85 weight percent. The concentration of the optional non-solvent (glycerol) is preferably from about 0 to about 80 weight percent, more preferably from about 5 to about 60 weight percent.

In the case of membranes useful for dialysis, the concentration of cellulose ester is preferably at least about 10 weight percent, more preferably at least about 15 weight percent; the concentration of cellulose ester is preferably less than about 60 weight percent, more preferably less than about 55 weight percent. The concentration of the solvent (glycerol monoacetate/glycerol diacetate/glycerol triacetate/mixtures thereof) is preferably at least about 40 weight percent, more preferably at least about 45 weight percent; the concentration of the solvent is preferably less than about 90 weight percent, more preferably less than about 85 weight percent. The concentration of the optional non-solvent (glycerol) is preferably from about 0 to about 50 weight percent, more preferably from about 5 to about 40 weight percent.

In the case of membranes useful for reverse osmosis, the concentration of cellulose ester is preferably at least about 25 weight percent, more preferably at least about 35 weight percent; the concentration of cellulose ester is preferably less than 65 weight percent, more preferably less than about 60 weight percent. The concentration of the solvent (glycerol monoacetate/glycerol diacetate/glycerol triacetate/mixtures thereof) is preferably at least about 15 weight percent, more preferably at least about 25 weight percent, even more preferably at least about 35 weight percent; the concentration of solvent is preferably less than about 75 weight percent, more preferably less than about 65 weight percent. The concentration of the optional non-solvent (glycerol) is preferably from about 0 to about 30 weight percent, more preferably from about 0 to about 20 weight percent.

The compositions of this invention may be used to fabricate membranes useful for membrane liquid separation processes such as microfiltration, ultrafiltration, dialysis, and reverse osmosis. Such membranes may be fabricated by several alternative process schemes such as shown in FIGS. 1-3. In one preferred process, designated process I in FIG. 1, the cellulose ester composition is extruded, molded, or cast, then air quenched. In another preferred process, designated process II in FIG. 2, the cellulose ester composition is extruded, molded, or cast, quenched, leached, and dried. In still another preferred process, designated process III in FIG. 3, the cellulose ester composition is extruded, molded, or cast, quenched, leached, replasticized, and dried. The choice of a membrane fabrication process is in part determined by the membrane properties desired.

The membranes are first extruded, molded, or cast from the cellulose ester compositions hereinbefore described. In the case of casting, a homogeneous blend is prepared which possesses a suitable viscosity for casting at a given temperature. For casting, the viscosity of the blend is preferably from about 2 to about 25 poise. The casting blend may be cast at room temperature or at elevated temperatures depending upon the viscosity of the blend. The blend is preferably cast at a temperature of from about 25° to about 200° C. In the embodiment wherein the membrane is useful for ultrafiltration or microfiltration, the casting blend preferably contains at least about 8 weight percent cellulose ester, more preferably at least about 12 weight percent cellulose ester; the concentration of cellulose ester in the blend is preferably less than about 50 weight percent, more preferably less than about 40 weight percent. In the embodiment wherein the membrane is useful for dialysis, the blend preferably contains at least about 8 weight percent cellulose ester, more preferably at least about 12 weight percent cellulose ester; the blend preferably contains less than about 50 weight percent cellulose ester, more preferably less than about 40 percent cellulose ester. In the embodiment wherein the membrane is useful for reverse osmosis, the blend preferably contains about 10 weight percent cellulose ester, more preferably at least about 15 weight percent cellulose ester; the blend preferably contains less than about 60 weight percent cellulose ester, more preferably less than about 50 weight percent cellulose ester. The blend may be cast by pouring the blend onto a smooth support surface and drawing down the blend to an appropriate thickness with a suitable tool such as a doctor blade or casting bar. Alternately, the blend may be cast in a continuous process by casting the blend onto endless belts or rotating drums. The casting surface is such that the finished membrane may thereafter be readily separated from the surface. For example, the membrane may be cast onto a support having a low surface energy, such as silicone, coated glass, or metal, or a surface to which the membrane will not adhere. The blend may also be cast onto the surface of a liquid with which the polymer is immiscible, such as water or mercury. Alternately, the blend may be cast onto a support surface, such as a nonwoven web, which may thereafter be dissolved away from the finished membrane. The membrane may also be cast onto a permanent support surface which does not substantially impede transport through the membrane. The membranes are then processed in a manner similar to that described hereinafter for extruded membranes.

In the case of extrusion, the components of the extrusion composition may be combined prior to extrusion by mixing in any convenient manner with conventional mixing equipment, as for example in a Hobart mixer. Alternatively, the extrusion composition may be homogenized by extruding the mixture through a twin screw extruder, cooling the extrudate, and grinding or pelletizing the extrudate to a particle size readily fed to a single or twin screw extruder. The components of the extrusion composition may also be combined directly in a melt-pot or twin screw extruder and extruded into membranes in a single step.

The viscosity of the mixture must not be so high that the mixture is too viscous to extrude at temperatures which do not deleteriously affect the polymer; on the other hand, the viscosity must not be so low that the mixture does not maintain its desired shape upon exiting the extrusion die. The membrane may retain its desired shape upon extrusion by cooling or by coagulation. In the embodiment wherein the membrane is useful for ultrafiltration or microfiltration, the mixture preferably contains at least about 8 weight percent cellulose ester, more preferably at least about 15 weight percent cellulose ester; the mixture preferably contains less than about 80 weight percent cellulose ester, more preferably less than about 60 weight percent cellulose ester. In the embodiment wherein the membrane is useful for dialysis, the mixture preferably contains at least about 8 weight percent cellulose ester, more preferably at least about 15 weight percent cellulose ester; the mixture preferably contains less than about 80 weight percent cellulose ester, more preferably less than about 60 weight percent cellulose ester. In the embodiment wherein the membrane is useful for reverse osmosis, the mixture preferably contains at least about 10 weight percent cellulose ester, more preferably at least about 15 weight percent cellulose ester; the mixture preferably contains less than about 80 weight percent cellulose ester, more preferably less than about 60 weight percent cellulose ester.

The mixture is heated to a temperature which results in a homogeneous fluid possessing a viscosity suitable for extrusion. The temperature should not be so high as to cause significant degradation of the cellulose ester. The temperature should not be so low as to render the fluid too viscous to extrude. The extrusion temperature is preferably at least about 20° C., more preferably at least about 25° C.; the extrusion temperature is preferably less than about 250° C., more preferably less than about 220° C.

The mixture of polymer, solvent, and optional nonsolvent is extruded through a sheet, hollow tube, or hollow fiber die (spinnerette). Hollow fiber spinnerettes typically are multi-holed and thus produce a tow of multiple hollow fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the polymer such as water or glycerol. The temperature and composition of the core fluid can affect the properties of the membrane.

The extrudate exiting the die enters one or more quench zones. The environment of the quench zone may be gaseous or liquid. Within the quench zone, the extrudate is subjected to cooling to cause gelation and solidification of the membrane. In the preferred embodiment designated process I in FIG. 1, the membranes are quenched in air. Within the quench zone, the membranes gel and solidify. The temperature of the air zone is preferably at least about 10° C., more preferably at least about 20° C.; the temperature of the air zone is preferably less than about 100° C., more preferably less than about 80° C. The residence time in the air zone is preferably less than about 180 seconds, more preferably less than about 30 seconds, even more preferably less than about 10 seconds. Shrouds may be used to help control air flow rates and temperatures in the air quench zone.

Following or instead of the air quench, the membranes may optionally be quenched in a liquid which is substantially a non-solvent for the polymer, such as water or a mixture of water and the glycerol acetate solvents and/or the non-solvent glycerol. Some removal of the solvent and/or non-solvent from the membrane may occur in the liquid quench zone. The temperature of the liquid quench zone is preferably at least about 0° C., more preferably at least about 2° C.; the temperature of the liquid quench zone is preferably less than about 60° C., more preferably less than about 30° C., even more preferably less than about 10° C. The residence time in the liquid quench zone at the liquid quench temperature should be sufficient to gel and solidify the membranes. The residence time in the quench liquid is preferably less than about 60 seconds, more preferably less than about 30 seconds.

The fibers or films are optionally drawn down using godet rollers or other conventional equipment to the appropriate size. Line speeds are not generally critical and may vary over a wide range. Minimum preferred line speeds are at least about 10 feet per minute for reasons of economy in operation, more preferably at least about 100 feet per minute. Maximum preferred line speeds are less than about 1000 feet per minute for ease in handling, more preferably less than about 500 feet per minute.

The desired thickness for the membrane will depend upon its intended end use and other factors. In the embodiment wherein the membrane is useful for ultrafiltration or microfiltration, films are preferably from about 10 microns to about 100 microns in thickness; hollow fibers for ultrafiltration or microfiltration preferably possess an outside diameter from about 100 microns to about 5000 microns, more preferably from about 200 microns to about 3000 microns, with a wall thickness of preferably from about 10 microns to about 500 microns, more preferably from about 15 microns to about 200 microns. In the embodiment wherein the membrane is useful for dialysis, films are preferably from about 10 microns to about 75 microns in thickness; hollow fibers for dialysis preferably possess an outside diameter of from about 100 microns to about 500 microns, more preferably from about 175 microns to about 300 microns, with a wall thickness of preferably from about 5 to about 50 microns, more preferably about 10 to about 30 microns. In the embodiment wherein the membrane is useful for reverse osmosis, films are preferably from about 10 microns to about 500 microns in thickness; hollow fibers for reverse osmosis preferably possess an outside diameter of from about 100 microns to about 800 microns, more preferably from about 150 microns to about 500 microns, with an outer diameter to inner diameter ratio of preferably from about 1.2 to about 3.5, more preferably from about 1.8 to about 2.5.

In another preferred embodiment designated process II in FIG. 2, following quenching the membranes are passed through at least one leach zone containing a liquid which is substantially a non-solvent for the polymer such as water or a mixture of water and the glycerol acetate solvents and/or the non-solvent glycerol to remove at least a portion of the solvent and optional non-solvent. The leach bath need not remove all of the solvent and optional non-solvent from the membrane. The leach bath preferably contains up to about 75 weight percent glycerol in water, more preferably up to about 50 weight percent glycerol in water. The minimum temperature of the leach bath is such that removal of the solvent and optional non-solvent from the membrane occurs at a reasonable rate. The minimum temperature of the leach bath is preferably at least about −10° C., more preferably at least about 0° C., even more preferably at least about 10° C. The maximum temperature of the leach bath is below that temperature at which membrane integrity is deleteriously affected. The temperature of the leach bath is preferably less than about 100° C., more preferably less than about 90° C. The residence time in the leach bath is preferably less than about 1000 seconds, more preferably less than about 400 seconds. The membranes may be drawn down to the desired size prior to entrance into the leach bath, during the residence time in the leach bath, subsequent to exiting the leach bath, or a combination thereof.

Following leaching, the membranes are optionally dried. The membranes may be dried in air or an inert gas such as nitrogen. The air or inert gas used to dry the membrane should have a low enough initial water content so that drying of the membrane takes place at reasonable rates. Room air is a suitable and convenient source for drying the membrane. The membranes may be dried at temperatures at which drying takes place at a reasonable rate and which do not adversely affect the membrane. The drying temperature is preferably at least about 10° C., more preferably at least 20° C. The drying temperature is preferably less than about 120° C., more preferably less than about 90° C. The drying time is preferably at least about 30 seconds, more preferably at least about 60 seconds. The membranes may be dried under reduced pressures.

In still another preferred embodiment, designated process III in FIG. 3, the membranes may be leached in a liquid such as water, then subjected to a replasticization step prior to drying. The membranes are leached to remove at least a portion of the solvent and optional non-solvent. The leach bath need not remove all of the solvent and optional non-solvent from the membrane. The minimum temperature of the leach bath is such that removal of the solvent and optional non-solvent occurs at a reasonable rate. The minimum temperature of the leach bath is preferably at least about −10° C., more preferably at least about 0° C., even more preferably at least about 10° C. The maximum temperature of the leach bath is below that temperature at which membrane integrity is adversely affected. The maximum temperature of the leach bath is preferably less than about 100° C., more preferably less than about 90° C. The residence time in the leach bath is preferably less than about 1000 seconds, more preferably less than about 400 seconds.

The leached membranes may be replasticized by passing them through at least one replasticization zone such as a glycerol and water bath. In the embodiment wherein the membrane is useful for microfiltration or ultrafiltration, the replasticization bath preferably contains up to about 80 weight percent glycerol, more preferably up to about 60 weight percent glycerol. In the embodiment wherein the membrane is useful for dialysis, the replasticization bath preferably contains up to about 70 weight percent glycerol, more preferably up to about 60 weight percent glycerol. In the embodiment wherein the membrane is useful for reverse osmosis, the replasticization bath preferably contains up to about 70 weight percent glycerol, more preferably up to about 50 weight percent glycerol. The minimum temperature of the replasticization bath is such than replasticization of the membrane occurs at a reasonable rate. The minimum temperature of the glycerol replasticization bath is preferably at least about 10° C., more preferably at least about 20° C. The maximum temperature of the replasticization bath is below that temperature at which membrane integrity is adversely affected. The maximum temperature of the replasticization bath is preferably less than about 80° C., more preferably less than about 60° C.

In one preferred embodiment of the invention, as the concentration of the glycerol acetates in the leach and/or replasticization bath rises, a portion of the bath may be withdrawn, subjected to a gentle hydrolysis to convert the glycerol acetates to glycerol and sodium acetate, then the treated portion returned to the leach and/or replasticization bath. This recycle reduces or eliminates the need for disposal of solvent containing leach or replasticization water while simultaneously converting the glycerol acetates to a replasticizer. The membranes may be drawn down to the appropriate size at any point before, during, or after the leach or replasticization bath.

The membranes formed by the hereinbefore described processes may contain significant amounts of solvent and optional non-solvent, depending on the quench, leach, and replasticization conditions used. The membranes may contain up to about 75 percent solvent and optional non-solvent following fabrication. For some applications, such membranes containing significant levels of solvent and optional non-solvent may be stored for long periods of time without adverse impact on membrane separation properties. Furthermore, since the solvents and optional non-solvent used are or can be converted into substances the presence of which are compatible and/or accepted in the end use of said membrane, membranes containing significant levels of solvent and optional non-solvent may be used in liquid separations without extensive leaching prior to use depending upon the application.

The membranes formed by the described processes may be used in membrane liquid separation processes such as microfiltration, ultrafiltration, dialysis, and reverse osmosis. The membrane device fabrication process is generally performed so as to tailor the resulting membrane device for its specific end use. Such adaptation is readily achieved by one skilled in the art.

Ultrafiltration and microfiltration are pressure driven filtration processes using porous membranes in which particles or solutes are separated from solutions. Separation is achieved on the basis of differences in particle size or molecular weight. Such membranes may be characterized by the hydraulic permeability and the sieving coefficient. The hydraulic permeability is a measure of the volume of solvent transported through the membrane under the influence of a pressure gradient. The hydraulic permeability, $P_h$, is expressed at a specified temperature.

$$P_h = \frac{\text{(amount of solvent permeated)}}{\text{(membrane area) } (\Delta P \text{ across membrane) (time)}}$$

where $\Delta P$ is the pressure differential across the membrane. The hydraulic permeability is commonly expressed in units of $$\frac{\text{milliliters}}{(\text{meter})^2 \text{ (hour) (centimeters Hg)}}.$$

The ultrafiltration and microfiltration membranes of this invention preferably have an hydraulic permeability for water at 25° C. of at least about $$\frac{10 \text{ milliliters}}{(\text{meter})^2 \text{ (hour) (centimeters Hg)}}.$$

The sieving coefficient is designated $\Phi$.

$$\Phi = C_f/C_s$$

where $C_f$ is the concentration of a small volume of filtrate at a given moment and $C_s$ is the simultaneous concentration of the filtering solution. In a closed system, both $C_f$ and $C_s$ increase with time when $0 < \Phi < 1$.

Ultrafiltration and microfiltration membranes may also be characterized by their porosity and pore size. Porosity refers to the volumetric void volume of the membrane. Membranes of this invention useful for ultrafiltration and microfiltration preferably have a porosity of between about 20 and about 80 percent. Pore size may be estimated by several techniques, including by scanning electron microscopy and/or measurements of bubble point, solvent flux, and molecular weight cutoff. Such techniques are well known in the art for characterizing the pore size of microporous membranes, see Robert Kesting, *Synthetic Polymeric Membranes*, 2nd edition, John Wiley & Sons, New York, 1985, pp. 46–56; Channing R. Robertson (Stanford University), *Molecular and Macromolecular Sieving by Asymmetric Ultrafiltration Membranes*, OWRT Report, NTIS No. PB85-1577661EAR, September 1984; and ASTM Test Method F316–86, the relevant portions of which are incorporated herein by reference. The average pore sizes of the membranes of this invention useful for ultrafiltration are preferably from about 20 Angstroms to about 500 Angstroms. The average pore sizes of the microfiltration membranes of this invention are preferably from about 0.05 micron to about 10 microns. The rejection of various solutes may be tested by successively feeding a solution containing a solute to one side of the ultrafiltration or microfiltration membrane of a given temperature and pressure and analyzing the permeate collected from the other side of the membrane to determine the extent of solute rejection. The percent rejection is calculated using the equation $100 \times [1 - (C_p/C_F)]$ where $C_p$ is the concentration of the solute in the permeate and $C_F$ is the concentration of the solute in the feed. A series of different solutes with different nominal molecular weights may be used such as Blue Dextran 2,000,000, AP Ferritin 490,000, Albumin 69,000, Cytochrome C 12,400, Vitamin B-12 1335 and Methylene Blue 320. Ultrafiltration membranes of this invention preferably possess molecular cut-offs of between about 500 and about 300,000.

Dialysis is a process whereby solute molecules are exchanged between two liquids by diffusion through a semi-permeable membrane under the influence of a chemical potential gradient across the membrane separating the two liquids. The ability of a membrane to perform a dialysis separation may be characterized by the overall diffusive mass transfer coefficient, $K_{OV}$, for the solute of interest. In particular, membranes useful for the dialysis of blood may be characterized by the overall diffusive mass transfer coefficient for urea, $K_{OV}$(urea).

$K_{OV}$(urea) is commonly expressed in units of centimeters/minute. Membranes of this invention useful for blood dialysis preferably possess an overall diffusive mass transfer coefficient for urea at 37° C. of at least about $20 \times 10^{-3}$ centimeters/minute. Membranes of this invention useful for dialysis preferably have an hydraulic permeability for the removal of water from blood at 37° C. of at least about $$\frac{10 \text{ milliliters}}{\text{hour meter}^2 \text{ cmHg}}$$

Reverse osmosis is used for the purification or concentration of solutions containing salts or other low molecular weight solutes, such as in the desalination of brackish water or seawater. In reverse osmosis, a pressure exceeding the osmotic pressure is applied to the feed solution (high concentration side), causing the solvent to permeate through the semi-permeable membrane from the high concentration side to the low concentration side of the membrane. The pressure in excess of the osmotic pressure is the effective pressure and constitutes the driving force for solvent transport across the membrane. The salt or other solute is "rejected" by the membrane, that is, the salt does not readily pass through the membrane. The membrane's separation performance may be characterized by the flux of water through the membrane and the salt rejection.

The rate of water flux through the membrane =

$$\frac{\text{amount of water permeated}}{(\text{membrane area}) (\text{time})}$$

under given conditions of feed concentration, temperature, and pressure. The rate of water flux is commonly expressed in gallons per square foot of membrane area per day (GFD).

Salt Rejection (%) =

$$\left[ 1 - \frac{\text{Concentration of Permeate Water}}{\text{Concentration of Feed Water}} \right] \times 100$$

Membranes of this invention useful for home reverse osmosis applications at a feed pressure of 50 pounds per square inch and 0.05 weight percent NaCl feed concentration preferably have a water flux of at least about 0.4 GFD and a salt rejection of preferably at least about 80 percent. Membranes of this invention useful for low pressure reverse osmosis applications at a feed pressure of 250 pounds per square inch and 0.15 percent NaCl feed concentration preferably have a water flux of at least about 2 GFD and a salt rejection of preferably of at least about 90 percent. Membranes of this invention useful for standard pressure reverse osmosis applications at a feed pressure of 400 pound per square inch and 0.15 weight percent NaCl feed concentration preferably have a water flux of at least about 2 GFD and a salt rejection of preferably at least about 90 percent. Membranes of this invention useful for seawater reverse osmosis applications at a feed pressure of 800 pounds per square inch and 3.5 weight percent NaCl feed concentration have a water flux of at least about 0.5 GFD and a salt rejection of at least about 97 percent.

SPECIFIC EMBODIMENTS

The following examples are presented to illustrate the invention only and are not intended to limit the scope of the invention or claims.

EXAMPLE 1

Miscibility Diagram for Cellulose Triacetate/Hallco TM C-918 Monoacetin/Glycerol Blends A miscibility diagram for cellulose triacetate, Hallco TM C-918 Monoacetin (TM trademark of C.P. Hall Company), and glycerol blends is shown in FIG. 4. The diagram is constructed by determining the miscibility of various compositions of the three components at room temperature and pressure.

Cellulose triacetate with an acetyl content of about 44 weight percent is obtained from Daicel Chemical. Hallco TM C-918 Monoacetin is obtained from the C.P. Hall Company. Hallco TM C-918 Monoacetin is not a pure compound but is a mixture of glycerol acetates and glycerol. Analysis by gas phase chromatography gives the following lot composition for Hallco TM C-918 Monoacetin:

| Hallco TM C-918 Monoacetin | Composition (Area Percent) |
| --- | --- |
| Glycerol Monoacetin | 50.0 |
| Glycerol Diacetin | 28.8 |
| Glycerol Triacetin | 1.9 |
| Glycerol | 19.2 |
| Glycerol is obtained from J. T. Baker Chemical Company. | |

Solutions of various compositions of the three components are prepared in 2,2,2-trifluoroethanol. Drops of each solution are placed on a microscope slide, the 2,2,2-trifluoroethanol evaporated, and the resulting film microscopically examined with a polarizing microscope equipped with phase contrast objectives and a phase contrast condenser. Films from compositions within the boundaries of the areas labeled "1" in FIG. 4 exhibited single phase characteristics; films from compositions within the boundaries of the area labeled "M" exhibited multi-phase characteristics.

EXAMPLE 2

Ultrafiltration Applications

Example 2-1—Cellulose Diacetate Hollow Fibers

A mixture of cellulose diacetate from Eastman Chemical designated CA394-60, Hallco TM C-918 Monoacetin, and glycerol is mixed in a Hobart mixer to give a blend comprising by weight 34 percent cellulose diacetate, 47 percent Hallco TM C-918 Monoacetin, and 19 percent glycerol.

The mixed blend is extruded into hollow fibers with a ¾ inch single screw extruder equipped with a 16 hole spinnerette at a temperature of about 128° to 149° C. The fibers are air quenched and drawn at a rate of 100 feet/minute. One sample received an additional cold draw of 10 percent. The solvent and non-solvent are removed from the fibers by flushing with water.

The fibers are formed into test cells, each containing 160 fibers, to measure hydraulic permeability and solute rejection rates. To measure the hydraulic permeability of the membranes, water inside the bores of the hollow fibers at room temperature is subjected to a pressure of about 9 cmHg. The water permeating outside of the fibers is measured by observing the increase in water volume outside the fibers. To determine the solute rejection rates, solutions of the various solutes are fed to the test cell at room temperature to the bores of the hollow fibers by means of a pump. The permeate is collected and analyzed to determine the extent of solute rejection. The percent rejection is calculated using the equation $100 \times [1-(Cp/CF)]$ where Cp is the concentration of the solute in the permeate and CF is the concentration of the solute in the feed. The different solutes used and their nominal molecular weights are Blue Dextran 2,000,000, AP Ferritin 490,000, and Albumin 69,000. Data are reported in Table IIA.

TABLE IIA

PERFORMANCE CHARACTERISTICS OF HOLLOW FIBER ULTRAFILTRATION MEMBRANES

| Sample | Fiber Size (Microns) | Hydraulic Permeability ml m² hr cmHg | Solute/Rejection (%) Albumin | AP Ferritin | Blue Dextran |
|---|---|---|---|---|---|
| 1 | 237 × 275 | 468 | 84.7 | 93.7 | 98.0 |
| 2 | 233 × 270 | 485 | 85.4 | 93.1 | 97.7 |
| 3* | 224 × 261 | 844 | 39.1 | 58.8 | 92.3 |

*cold drawn additional 10%

Example 2-2—Cellulose Triacetate Flat Sheets

A casting solution is prepared by dissolving about 300 g of cellulose triacetate powder in about 1700 g of Hallco ® C-918 Monoacetin under heating at about 200° C. with stirring for about 1½ hours. The blend is cooled and stored.

About 50 grams of the blend are heated with stirring to about 160° C. The viscosity of the solution is about 11.25 poise at 160° C. as measured in a Brookfield viscometer. The solution is hot cast onto a Pyrex glass plate heated to about 140°-150° C. with a 20 mil casting bar. Immediately after casting, the membrane is quenched in room temperature water. The membrane is leached in room temperature water overnight. The final thickness of the wet membrane is about 5.7 mil.

A membrane is cut from the cast film and mounted in an Amicon ultrafiltration cell with an effective surface area of 12 cm². The measured flux of distilled water through the membrane is 8.5 GFD at 8.75 psi. A solution of Blue Dextran 2,000,000 is made up in a concentration of about 2.8 grams/liter, buffered with 1.0 gram/liter of dibasic sodium phosphate. The measured flux of the Blue Dextran solution through the membrane is 5.4 GFD at 8.85 psi, with a rejection rate of Blue Dextran of greater than 99.7 percent.

EXAMPLE 3

Dialysis Applications

Hollow fiber membranes are spun from various blend compositions containing cellulose diacetate, glycerol monoacetate, glycerol diacetate, and glycerol via the spinning processes designated process I, process II, and process III in FIGS. 1-3. The cellulose diacetate is obtained from Eastman Chemical Products, Inc. The product designation for the cellulose diacetate is CA-394-60 in all cases except for Example 3-5 in which it is CA-398-30. The glycerol monoacetate is obtained from C.P. Hall under the product designation Hallco ™ C-918 Monoacetin. Hallco ™ C-918 Monoacetin is not a pure compound, but a mixture of glycerol acetates and glycerol. Analysis by gas phase chromatography gives the following lot composition for Hallco ™ C-918 Monoacetin:

| Hallco ™ C-918 Monoacetin | Composition (Area Percent) |
|---|---|
| Glycerol Monoacetate | 50.0 |
| Glycerol Diacetate | 28.8 |
| Glycerol Triacetate | 1.9 |
| Glycerol | 19.2 |

The glycerol diacetate is obtained from C.P. Hall under the product designation Hallco ™ C-491 Diacetin. Hallco ™ C-491 Diacetin is not a pure compound, but a mixture of glycerol acetates and glycerol. Analysis by gas phase chromatography gives the following lot composition for Hallco ™ C-491 Diacetin:

| Hallco ™ C-491 Diacetin | Composition (Area Percent) |
|---|---|
| Glycerol Diacetate | 52.5 |
| Glycerol Monoacetate | 29.3 |
| Glycerol Triacetate | 14.9 |
| Glycerol | 3.3 |

The glycerol can be obtained from The Dow Chemical Company. The glycerol triacetate can be obtained from Eastman Chemical.

The blend compositions may be homogenized by performing an initial compounding extrusion, pelletizing the extrudate, and re-extruding the pellets into hollow fibers. The fibers from the different spin runs are assembled into test cells and the hydraulic permeability and diffusive mass transfer coefficient for urea determined. Data are shown in Table III.

PROCESS I

EXAMPLE 3-1

A blend composition is prepared consisting of about 34 percent cellulose diacetate (CDA), 47 percent Hallco ™ C-918 Monoacetin, and 19 percent glycerol by weight. (The resulting composition corresponds to about 34 percent cellulose diacetate, 27.9 percent glycerol 23.5 percent glycerol monoacetate, 13.5 percent glycerol diacetate, and 0.9 percent glycerol triacetate by weight.) The blend is extruded at about 162° C. and quenched in air. The fiber size measured wet is about 211 microns in internal diameter with a wall thickness of about 12 microns.

Example 3-2

A blend composition is prepared consisting of about 34 percent cellulose diacetate (CDA), 38 percent Hallco ™ C-918 Monoacetin and 28 percent glycerol by weight. (The resulting composition corresponds to about 34 percent cellulose diacetate, 35.3 percent glycerol, 19.0 percent glycerol monoacetate, 10.9 percent glycerol diacetate, and 0.7 percent glycerol triacetate by weight.) The blend is extruded at about 167° C., quenched in air, and cold drawn 10 percent. The resulting wet fiber size is about 207 microns in internal diameter with a wall thickness of about 17.5 microns.

PROCESS II

Example 3-3

A blend composition is prepared consisting of about 35 percent cellulose diacetate (CDA), 53 percent Hallco ™ C-918 Monoacetin, and 12 percent glycerol by weight. (The resulting composition corresponds to about 35 percent cellulose diacetate, 22.2 percent glycerol, 26.5 percent glycerol monoacetate, 15.3 percent glycerol diacetate, and 1.0 percent glycerol triacetate by weight. Following the initial compounding step, the blend contains about 39.0 percent cellulose diacetate, 21.7 percent glycerol, 24.5 percent glycerol monoacetate, 14.7 percent glycerol diacetate, and 1.0 percent glycerol triacetate by weight.) The blend is extruded at about 152° C., quenched in air, passed through a bath at a temperature of about 75° C. containing 50 weight percent glycerol and 50 weight percent water, drawn 13 percent, and dried in air at about 50° C. for about 5 minutes. The final membrane composition is about 57.0 percent cellulose diacetate, 36.0 percent glycerol, 3.2 percent glycerol monoacetate, 3.1 percent glycerol diacetate, and 1.0 percent glycerol triacetate by weight. The final wet fiber size is about 213 microns in internal diameter with a wall thickness of about 15 microns.

Example 3-4

A blend composition is prepared consisting of about 42 percent cellulose diacetate (CDA), 47.3 percent Hallco ™ C-918 Monoacetin, and 11.7 percent glycerol by weight. (The resulting composition corresponds to 42 percent cellulose diacetate, 20.8 percent glycerol, 23.6 percent glycerol monoacetate, 13.7 percent glycerol diacetate, and 0.9 percent glycerol triacetate by weight. Following the initial compounding step, the blend contains about 42.0 percent cellulose diacetate, 20.8 percent glycerol, 23.2 percent glycerol monoacetate, 14.0 percent glycerol diacetate, and 1.0 percent glycerol triacetate by weight.) The fiber is processed in the manner described in Example 3-3. The final membrane composition is about 57.0 percent cellulose diacetate, 34.0 percent glycerol, 4.6 percent glycerol monoacetate, 4.0 percent glycerol diacetate, and 1.0 percent glycerol triacetate by weight. The final wet fiber size is about 223 micron internal diameter with a wall thickness of about 15 microns.

PROCESS III

Example 3-5

The initial blend composition is about 42 percent cellulose diacetate (CDA), 47 percent Hallco ™ C-918 Monoacetin, and 11 percent glycerol by weight. (The resulting composition corresponds to about 42.0 percent cellulose diacetate, 20.0 percent glycerol, 23.5 percent glycerol monoacetate, 13.5 percent glycerol diacetate, and 0.9 percent glycerol triacetate by weight.) The blend is extruded at about 166° C., quenched in air, passed through a water bath at a temperature of about 75° C. to remove the plasticizer, passed through an aqueous solution at ambient temperature containing about 30 to 60 weight percent glycerol, and dried in air at 75° C. for about 2 minutes. The final wet fiber size is about 206 microns in internal diameter with a wall thickness of about 22 microns.

Example 3-6

The initial blend composition is about 34 percent cellulose diacetate (CDA), 38 percent Hallco ™ C-918 Monoacetin, and 28 percent glycerol by weight. (The resulting composition corresponds to about 34.0 percent cellulose diacetate, 35.2 percent glycerol, 19.0 percent glycerol monoacetate, 10.9 percent glycerol diacetate, and 0.7 percent glycerol triacetate by weight.) Fibers are extruded in the manner described in Example 3-5. The fiber size measured wet is about 207 microns in internal diameter with a wall thickness of about 12 microns.

The overall mass transport rate for urea, $K_{OV(urea)}$, is determined by providing a water pool in a supply reservoir and pumping the same through the fiber lumens, the pool surrounding the fibers in the dialysis test unit being initially a water-urea solution. Measurements are made to determine the urea concentration in the recirculating fluid at given time intervals.

Tests are conducted at 37° C. and there is no pressure differential across the fiber wall surface during the tests.

The overall mass transfer rate for urea, $K_{OV}(urea)$, is determined by taking into account the differences in concentration of urea in the supply reservoir and in the dialysis test unit on the outside of the fibers as a function of time and the fiber area in accordance with the equation:

$$N = K_{OV}(urea)\, A(C_1 - C_2)$$

wherein

N = flux across the membrane in moles/minute $C_1$ = concentration on one side of the membrane in $\frac{\text{moles}}{(\text{centimeter})^3}$ $C_2$ = concentration on the other side of the membrane in $\frac{\text{moles}}{(\text{centimeter})^3}$ A = membrane area in (centimeters)$^2$.

In a two-chamber system without a pressure differential or resultant ultrafiltration the transfer of urea across the membrane wall may be integrated over a time interval, t, to yield the further equation:

$$\left[\frac{(C_1 - C_2)^{t=o}}{(C_1 - C_2)^t}\right] = \left[\frac{V_1 + V_2}{V_1 V_2} \cdot A\right] K_{OV}(urea) \cdot t$$

wherein $V_1$ is the volume of supply reservoir solution, and $V_2$ is the volume of the solution in the dialysis beaker.

In the tests, the volumes, $V_1$ and $V_2$ and the area A are measured separately so that a plot of the values on each side of the integrated equation produced a straight line, the slope of which allows $K_{OV}(urea)$ in units of centimeter per minute to be calculated.

Hydraulic permeability and the mass transfer coefficient for urea for membranes produced in Example 3 are summarized in Table III.

TABLE III

DIALYSIS APPLICATIONS

| Example | $P_h$* | $K_{OV}$(urea)** |
|---|---|---|
| 3-1 | 87 +/− 32 | 0.034 +/− 0.004 |
| 3-2 | 49.7 +/− 6.7 | 0.034 +/− 0.004 |
| 3-3 | 17.9 +/− — | 0.059 +/− — |
| 3-4 | 2.9 +/− 0.3 | 0.0235 +/− — |
| 3-5 | 6.3 +/− 0.6 | 0.033 +/− 0.004 |
| 3-6 | 210 +/− 27 | 0.0267 +/− .0025 |

\* $\frac{\text{milliliters}}{(\text{meter})^2 (\text{hour}) (\text{millimeters Hg})}$
\*\*centimeters/minute

EXAMPLE 4

Reverse Osmosis Applications

Hollow fiber cellulose triacetate (CTA) membranes are spun from various blend compositions containing glycerol monoacetate, glycerol diacetate, and glycerol via conventional spinning processes. The blends are prepared by mixing the various components to form a tacky powder of plasticized CTA which is then extruded in a conventional single screw extruder. The hollow fibers are extruded at about 180°–190° C., passed into air, quenched in water for about 3 seconds at about 4°–6° C., then leached in water at about 30 degrees to remove most of the plasticizer. The fibers are then optionally annealed for about 100 seconds in water at about 65° C. The cellulose triacetate is obtained from Daicel Chemical Industries Ltd. under the product designation Cellulose Triacetate Flakes. The glycerol monoacetate is obtained from C.P. Hall under the product designation Hallco TM C-918 Monoacetin. Hallco TM C-918 Monoacetin is not a pure compound, but a mixture of glycerol acetates and glycerol. Analysis by gas phase chromatography gives the following lot composition for Hallco TM C-918 Monoacetin:

| Hallco TM C-918 Monoacetin | Composition (Area Percent) |
|---|---|
| Glycerol Monoacetate | 46 |
| Glycerol Diacetate | 29 |
| Glycerol Triacetate | 5 |
| Glycerol | 20 |

The glycerol diacetate is obtained from C.P. Hall under the product designation Hallco TM C-491 Diacetin. Hallco TM C-491 Diacetin is not a pure compound, but a mixture of glycerol acetates and glycerol. Analysis by gas phase chromatography gives the following lot composition for Hallco TM C-491 Diacetin:

| Hallco TM C-491 Diacetin | Composition (Area Percent) |
|---|---|
| Glycerol Diacetate | 49 |
| Glycerol Monoacetate | 24 |
| Glycerol Triacetate | 24 |
| Glycerol | 3 |

The glycerol can be obtained from The Dow Chemical Company. The glycerol triacetate can be obtained from Eastman Chemical.

The wet hollow fibers obtained are formed into test cells for performance evaluation. A test cell contains a single hollow fiber which is passed through a stainless steel tube equipped with "Septa" tubing plugs at both ends. The "Septa" plugs serve as a barrier to prevent feed solution from leaking out from the feed compartment. A "Septa" plug is a silicon rubber disc commonly used in gas or liquid chromatograph devices to separate the sample injection port from the outside of the systems.

The water flux and salt rejection of the hollow fiber are measured by pumping a feed solution of 0.15 weight percent NaCl aqueous solution through the test cell under an operational pressure of 250 psi at a temperature of about 25° C. The permeate or product water which exits from the inside or lumen of the fiber is then collected. The concentration of NaCl in the product water is then measured.

Table IVA reports the results of tests investigating the effect of different ratios of Hallco TM C-918 Monoacetin and Hallco TM C-491 Diacetin in the blend composition on membrane performance. Table IVB lists the effect of additional glycerol in the blend composition on water flux and salt rejection. Table IVC shows the effect on membrane performance of additional glycerol and glycerol triacetate in the blend composition.

TABLE IVA

| | Blend Composition (Wt %) | | | Unannealed | | Annealed | |
|---|---|---|---|---|---|---|---|
| Sample | CTA | Hallco C-918* | Hallco C-491** | Fiber Size (microns) | Flux (GFD) | Salt Rejection (%) | Flux (GFD) | Salt Rejection (%) |
| 1 | 40 | — | 60 | 103 × 235 | — | — | 2.07 ± 0.27 | 99.21 ± 0.01 |
| 2 | 40 | — | 60 | 134 × 272 | 1.35 ± 0.32 | 88.81 ± 2.61 | 1.27 ± 0.17 | 98.82 ± 0.25 |
| 3 | 40 | — | 60 | 86 × 202 | 3.35 ± 0.03 | 97.57 ± 0.15 | 2.40 ± 0.13 | 99.11 ± 0.07 |
| 4 | 40 | 20 | 40 | 102 × 218 | 5.24 ± 0.07 | 83.94 ± 1.98 | 4.60 ± 0.12 | 95.31 ± 0.42 |
| 5 | 40 | 30 | 30 | 79 × 251 | — | — | 5.86 ± 0.65 | 77.94 ± 2.89 |
| 6 | 40 | 60 | — | 105 × 259 | — | — | 6.32 ± 0.50 | 25.54 ± 0.79 |

*Hallco TM C-918 Monoacetin contains about 45% glycerol monoacetate, 29% glycerol diacetate, 5% glycerol triacetate, and 20% glycerol by area
**Hallco TM C-491 Diacetin contains about 49% glycerol diacetate, 24% glycerol monoacetate, 24% glycerol triacetate, and 3% glycerol by area

TABLE IVB

| | Blend Composition (Wt %) | | | Fiber Size | Unannealed | | Annealed | |
|---|---|---|---|---|---|---|---|---|
| Sample | CTA | Hallco C-491* | Glycerol | (microns) | Flux (GFD) | Salt Rejection (%) | Flux (GFD) | Salt Rejection (%) |
| 7 | 40 | 50 | 10 | 99 × 216 | 4.82 ± 0.57 | 30.39 ± 1.30 | 3.93 ± 0.03 | 52.80 ± 0.91 |
| 8 | 40 | 50 | 10 | — | — | — | 6.28 ± 0.64 | 61.33 ± 4.02 |
| 9 | 40 | 40 | 20 | 86 × 173 | 0.06 ± 0.01 | — | — | — |

*Hallco TM C-491 Diacetin contains about 49% glycerol diacetate, 24% glycerol monoacetate, 24% glycerol triacetate, and 3% glycerol by area

TABLE IVC

| | Blend Composition (Wt %) | | | | Fiber | Unannealed | | Annealed | |
|---|---|---|---|---|---|---|---|---|---|
| Sample | CTA | Hallco C-491* | Glycerol | Glycerol Triacetate | Size (microns) | Flux (GFD) | Salt Rejection (%) | Flux (GFD) | Salt Rejection (%) |
| 10 | 40 | 58 | 1.7 | 0.3 | 118 × 271 | 2.20 ± 0.35 | 95.52 ± 1.0 | 1.39 ± 0.05 | 99.26 ± 0.05 |
| 11 | 40 | 55.1 | 4.2 | 0.7 | 91 × 196 | 2.62 ± 0.21 | 87.49 ± 1.48 | 1.35 ± 0.31 | 97.94 ± 0.15 |
| 12 | 40 | 54.3 | 1.8 | 3.9 | 90 × 205 | 2.69 ± 0.53 | 84.81 ± 9.13 | 1.96 ± 0.08 | 98.70 ± 0.22 |
| 13 | 40 | 50.6 | 1.9 | 7.5 | 161 × 277 | 1.89 ± 0.40 | 91.19 ± 0.61 | 1.22 ± 0.03 | 98.61 ± 0.27 |

*Hallco ™ C-491 Diacetin contains about 49% glycerol diacetate, 24% glycerol monoacetate, 24% glycerol triacetate, and 3% glycerol by area

What is claimed is:

1. A composition useful for preparing a semipermeable cellulose ester membrane comprising a mixture of:
   A. at least one cellulose ester, and
   B. at least one solvent which is non-harmful or non-deleterious selected from the group consisting essentially of glycerol monoacetate, glycerol diacetate, glycerol triacetate, and mixtures thereof, in an amount itself sufficient to solubilize the cellulose ester at the membrane formation temperature;
   wherein the cellulose ester and solvent are present in a ratio useful to form a semi-permeable membrane useful for a liquid separation process.

2. The composition of claim 1 wherein the mixture further comprises the non-solvent glycerol, wherein the glycerol is present in an amount which does not deleteriously affect preparation of the membrane from the mixture.

3. The composition of claim 2 wherein the mixture has a sufficient viscosity to allow extruding, molding, or casting a semi-permeable membrane at a temperature at which the mixture is homogeneous.

4. The composition of claim 3 wherein the mixture comprises by weight between about 10 and about 80 percent cellulose ester.

5. The composition of claim 4 wherein the cellulose ester is selected from the group consisting of cellulose acetate, cellulose diacetate, cellulose triacetate, and mixtures thereof.

6. The composition of claim 5 wherein the cellulose ester membrane is useful for ultrafiltration or microfiltration.

7. The composition of claim 6 wherein the ultrafiltration or microfiltration membrane has a porosity of between about 20 to about 80 percent.

8. The composition of claim 7 wherein the ultrafiltration membrane has an average pore size of about 20 to about 500 Angstroms and the microfiltration membrane has an average pore size of about 0.05 to about 10 microns.

9. The composition of claim 8 wherein the ultrafiltration membrane has a molecular weight cut-off of between about 500 and about 300,000.

10. The composition of claim 5 wherein the cellulose ester membrane is useful for dialysis.

11. The composition of claim 10 wherein the cellulose ester membrane for dialysis has a hydraulic permeability at 37° C. of at least about 10 milliliters/hour meter$^2$ cmHg.

12. The composition of claim 11 wherein the cellulose ester membrane for dialysis has an overall mass transfer coefficient for urea at 37° C. of at least about $20 \times 10^{-3}$ centimeters/minute.

13. The composition of claim 5 wherein the cellulose ester membrane is useful for reverse osmosis.

14. The composition of claim 13 wherein the cellulose ester membrane has a water flux of at least about 2 GFD at a feed pressure of 250 pounds per square inch and 0.15 weight percent NaCl feed concentration at about 25° C.

15. The composition of claim 14 wherein the cellulose ester membrane has a salt rejection of at least about 80 percent at a feed pressure of 250 pounds per square inch and 0.15 weight percent NaCl feed concentration at about 25° C.

16. A process for preparing a semi-permeable cellulose ester membrane comprising the steps of:
    A. forming a mixture comprising:
       i. at least one cellulose ester, and
       ii. at least one solvent which is non-harmful or non-deleterious selected from the group consisting essentially of glycerol monoacetate, glycerol diacetate, glycerol triacetate, and mixtures thereof, in an amount itself sufficient to solubilize the cellulose ester at the membrane formation temperature;
    B. heating the mixture to a temperature at which the mixture becomes a homogeneous fluid;
    C. extruding, molding, or casting the homogeneous fluid into a semi-permeable membrane; and
    D. passing the membrane through one or more quench zones wherein the membrane gels and solidifies;
    wherein the semi-permeable membrane so formed is useful for a membrane liquid separation process.

17. The process of claim 16 wherein the mixture further comprises the non-solvent glycerol, wherein the glycerol is present in an amount which does not deleteriously affect preparation of the membrane from the mixture.

18. The process of claim 17 which further comprises the additional step of:
    E. passing the membrane through one or more leach zones in which at least a portion of the solvent and non-solvent is removed from the membrane.

19. The process of claim 18 which further comprises the additional step of:
    F. passing the membrane through one or more replasticization zones in which the membrane is replasticized.

20. The process of claim 19 which further comprises the additional step of:
    G. drying the membrane.

21. A semi-permeable cellulose ester membrane comprising a semi-permeable cellulose ester membrane useful in liquid separations containing at least one compound selected from the group consisting essentially of glycerol monoacetate, glycerol diacetate, glycerol triacetate, and mixtures thereof, which was used on an amount itself sufficient to solubilize the cellulose ester at the membrane formation temperature.

22. The semi-permeable cellulose ester membrane of claim 21 wherein the semi-permeable cellulose ester membrane additionally contains glycerol.

23. The semi-permeable cellulose ester membrane of claim 22 wherein the total amount of glycerol monoacetate, glycerol diacetate, glycerol triacetate, and/or glycerol contained in the membrane is less than about 75 weight percent.

* * * * *